(12) United States Patent
Gerber et al.

(10) Patent No.: US 8,317,483 B2
(45) Date of Patent: Nov. 27, 2012

(54) WIND TURBINE ROTOR BLADE

(75) Inventors: Brandon Shane Gerber, Charleston, SC (US); Eric Lee Bell, Greenville, SC (US)

(73) Assignee: General Electric Company, Schenectady, NY (US)

( * ) Notice: Subject to any disclaimer, the term of this patent is extended or adjusted under 35 U.S.C. 154(b) by 33 days.

(21) Appl. No.: 12/968,739

(22) Filed: Dec. 15, 2010

(65) Prior Publication Data
US 2011/0223034 A1 Sep. 15, 2011

(51) Int. Cl.
*B64C 27/473* (2006.01)
(52) U.S. Cl. .......................................... 416/238
(58) Field of Classification Search ................. 416/225, 416/226, 228, 233, 238
See application file for complete search history.

(56) References Cited

U.S. PATENT DOCUMENTS

| | | | |
|---|---|---|---|
| 1,820,529 A * | 8/1931 | Darrieus | 416/196 R |
| 2,117,688 A * | 5/1938 | Stone | 416/88 |
| 2,674,327 A * | 4/1954 | Pullin et al. | 416/226 |
| 4,533,297 A * | 8/1985 | Bassett | 416/132 B |
| 6,513,757 B1 * | 2/2003 | Amaoka et al. | 244/123.7 |
| 6,582,196 B1 | 6/2003 | Anderson et al. | |
| 7,334,989 B2 * | 2/2008 | Arelt | 416/2 |
| 7,540,716 B2 * | 6/2009 | Wobben | 416/228 |
| 7,690,875 B2 | 4/2010 | Grabau | |
| 7,946,826 B1 * | 5/2011 | Koegler et al. | 416/238 |
| 2007/0025856 A1 * | 2/2007 | Moroz | 416/223 R |
| 2007/0252031 A1 | 11/2007 | Hackett et al. | |
| 2007/0253824 A1 * | 11/2007 | Eyb | 416/223 R |
| 2008/0206055 A1 | 8/2008 | Godsk et al. | |
| 2009/0068017 A1 * | 3/2009 | Rudling | 416/219 R |
| 2009/0068019 A1 | 3/2009 | Wobben | |
| 2009/0257885 A1 | 10/2009 | Godsk et al. | |
| 2009/0324416 A1 | 12/2009 | Bonnet | |
| 2010/0104444 A1 | 4/2010 | Garcia-Andujar et al. | |
| 2010/0239426 A1 * | 9/2010 | Westergaard | 416/226 |
| 2011/0008175 A1 * | 1/2011 | Gau | 416/233 |

FOREIGN PATENT DOCUMENTS

| | | |
|---|---|---|
| JP | 2004084590 A | 3/2004 |
| WO | WO 2008104629 A1 * | 9/2008 |

OTHER PUBLICATIONS

U.S. Appl. No. 12/837,529, filed Jul. 16, 2010.
U.S. Appl. No. 12/963,159, filed Dec. 8, 2010.

* cited by examiner

*Primary Examiner* — Ninh H Nguyen
(74) *Attorney, Agent, or Firm* — Dority & Manning, P.A.

(57) ABSTRACT

In one embodiment, a rotor blade includes a tip, a root, and a body extending between the tip and the root. The body has surfaces defining a pressure side, a suction side, a leading edge, and a trailing edge. The body further defines an inboard portion, an outboard portion, and a bend therebetween. The bend is defined such that the outboard portion extends outwardly with respect to the inboard portion. The bend is stiffened to reduce opening of the bend during deflection of the rotor blade.

20 Claims, 7 Drawing Sheets

WIND TURBINE ROTOR BLADE

FIELD OF THE INVENTION

The present disclosure relates in general to wind turbine rotor blades, and more particularly to rotor blades with features that provide various tower clearance advantages.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

In general, the design of a rotor blade is limited by a clearance threshold distance from the tower. For example, during operation of the wind turbine, the rotor blades may deflect towards the tower. To reduce the risk of the rotor blades contacting the tower and damaging the wind turbine, various certification rules require that the rotor blades be designed to utilize no more than, for example, approximately two-thirds of a static clearance distance when the rotor blades deflect. The static clearance distance, in general, is the non-deflected distance between the blade tip and the tower.

Thus, the required clearance threshold distance limits the design and performance of generally known rotor blades. Known prior art solutions to this limitation include, for example, incorporating a general flapwise curve into the rotor blade away from the tower, adjusting the tilt angle, coning the hub, and/or coning the rotor blade at the root. However, during extreme deflection of these prior art rotor blades, the rotor blades typically act similarly to beams, with the tips of the rotor blades "opening up" despite the flapwise curve and potentially striking the tower.

Thus, an improved rotor blade for a wind turbine would be desired. Specifically, a rotor blade with improved features for maintaining an appropriate tower clearance while allowing for improved rotor blade performance would be advantageous.

BRIEF DESCRIPTION OF THE INVENTION

Aspects and advantages of the invention will be set forth in part in the following description, or may be obvious from the description, or may be learned through practice of the invention.

In one embodiment, a rotor blade for a wind turbine is disclosed. The rotor blade includes a tip, a root, and a body extending between the tip and the root. The body has surfaces defining a pressure side, a suction side, a leading edge, and a trailing edge. The body further defines an inboard portion, an outboard portion, and a bend therebetween. The bend is defined such that the outboard portion extends outwardly with respect to the inboard portion. The bend is stiffened to reduce opening of the bend during deflection of the rotor blade.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
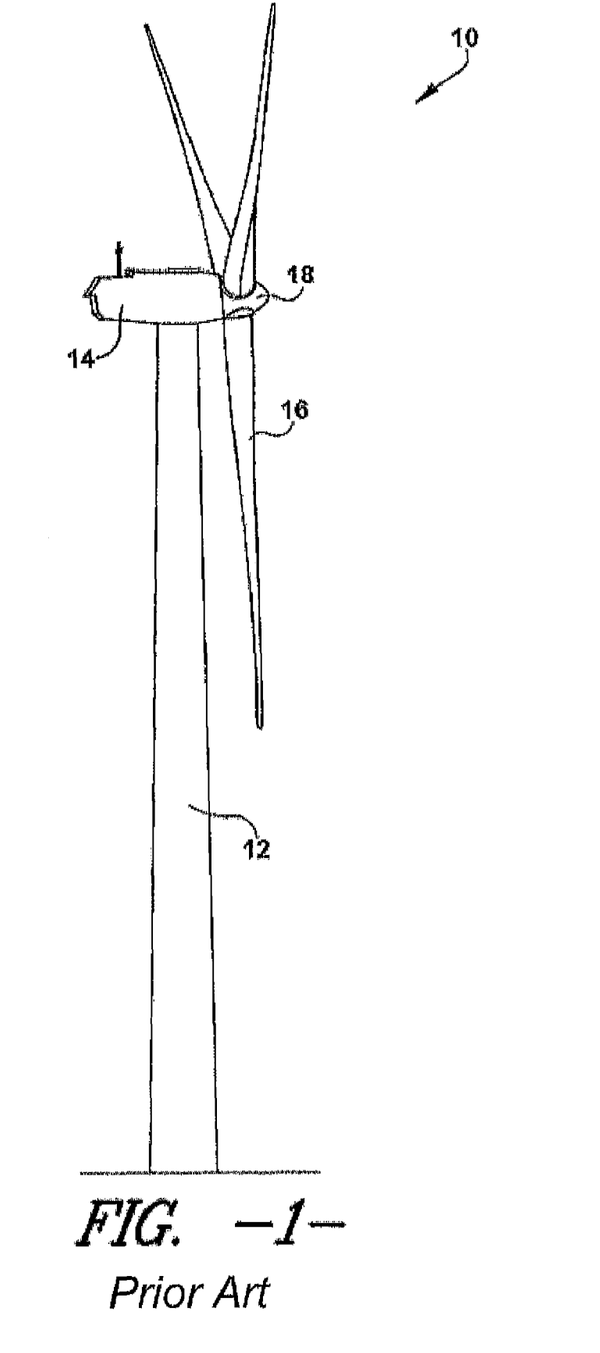
FIG. 1 illustrates a perspective view of a conventional wind turbine.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

During operation of the wind turbine 10, wind strikes the rotor blades 16 from a direction 20 (see FIG. 2), which causes the rotor blades 16 to rotate about an axis of rotation. As the rotor blades 16 are rotated and subjected to centrifugal forces, the rotor blades 16 are also subjected to various forces and bending moments. Thus, the rotor blades 16 may deflect from a neutral or non-deflected position to a deflected or loaded position, thereby reducing the tower clearance between the blade 16 and the tower 12. In order to monitor the position of the blades 16 and reduce the likelihood of a tower strike, a predetermined tower clearance threshold 22 (FIGS. 2 and 4) may be established. Thus, if one or more of the blades 16 deflect beyond this tower clearance threshold 22, a corrective action, such as adjusting the pitch of the blades 16 or altering the tilt angle of the nacelle 14, may be taken to increase the spacing between the tower 12 and the blade(s) 16. As used herein, the term "tower clearance threshold" generally corresponds to the minimum distance from the tower 12 at which the rotor blades 16 are maintained during operation of a wind turbine 10 so as to reduce the likelihood of a tower strike. Thus, it should be understood that the tower clearance threshold 22 may vary from wind turbine to wind turbine depending on, for example, the length of the rotor blades, the flexibility/rigidity of the rotor blades and/or the anticipated operating conditions of the wind turbine. Further, it should be understood that the tower clearance threshold 22 may vary based on various certification rules for the wind turbine 10. For example, certification rules may require that the tower clearance threshold 22 be approximately one-third of the static clearance distance of the rotor blade 16. As used herein, the term "static clearance distance" generally refers to the non-deflection distance between the tower 12 and the point on the rotor blade of closest approach during deflection to the tower 12.

Figure 2:
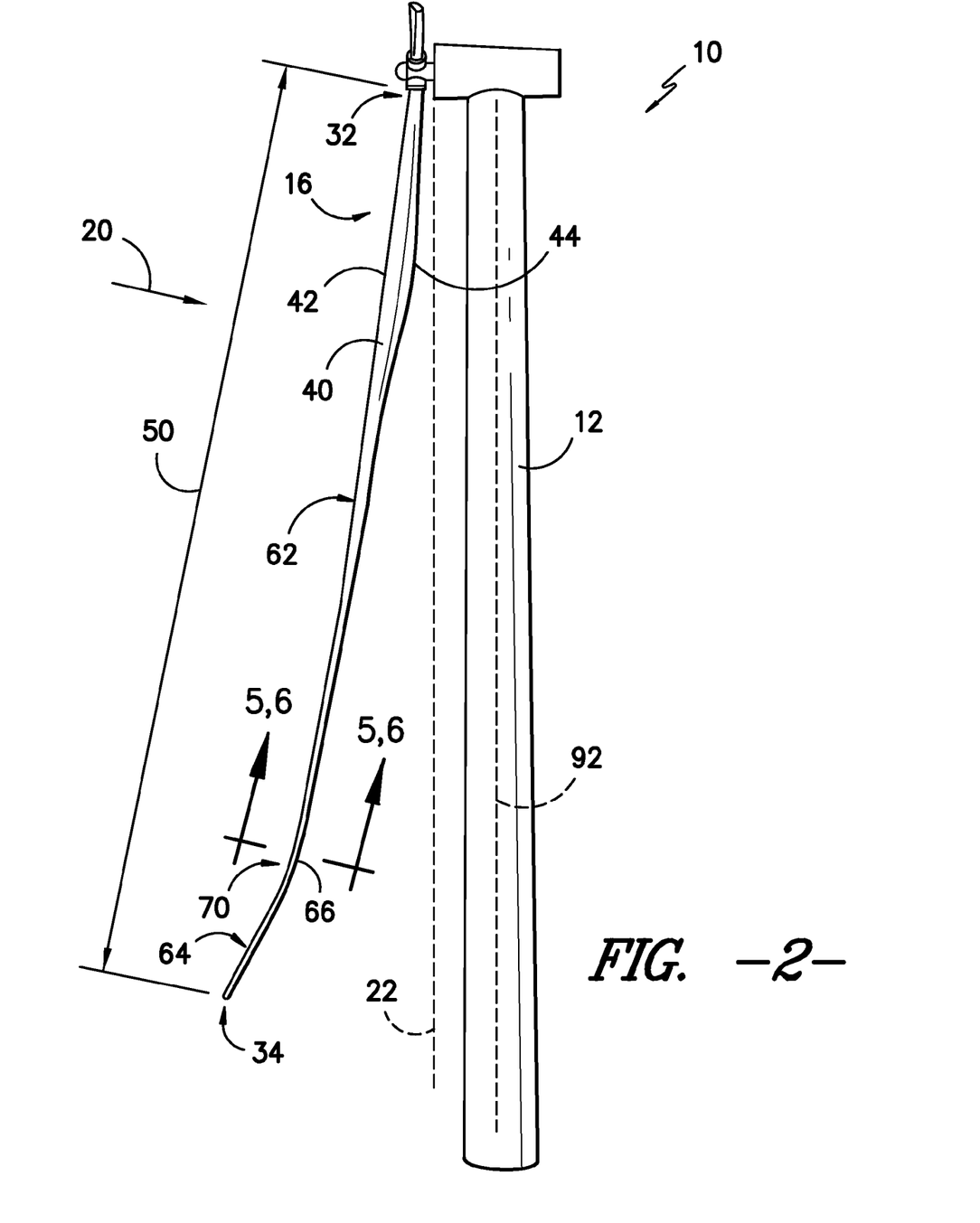
FIG. 2 is a side view of a rotor blade according to one embodiment of the present disclosure.

Referring now to FIG. 2, there is illustrated a side view of one embodiment of a rotor blade 16 for a wind turbine 10. As shown, the rotor blade 16 includes a root 32 for mounting the blade 16 to the hub 18 (FIG. 1). The rotor blade 16 also includes a tip 34 disposed at an end of the blade 16 opposite the root 32. A body 40 of the rotor blade 16 generally extends between the root 32 and the tip 34 and has surfaces defining a pressure side 42 and a suction side 44 extending between a leading edge 46 and a trailing edge 48 (see FIGS. 5 through 8).

FIG. 2 also illustrates a span 50 of the rotor blade 16. The span 50 may generally be the length of the rotor blade 16 from the root 32 to the tip 34, as is known in the art. As such, the root 32 may define a 0% span and the tip 34 may define a 100% span. It should be appreciated that the rotor blade 16 may generally have any suitable span 50. For example, in one embodiment, the rotor blade 16 may have a span ranging from about 15 meters to about 91 meters, such as from about 20 meters to about 85 meters or from about 40 meters to about 55 meters and all other subranges therebetween. However, other non-limiting examples may include spans of less than 15 meters or greater than 91 meters.

As disclosed above, the rotor blade 16 according to the present disclosure may desirably include improved features for maintaining the tower clearance threshold 22 while allowing for improved performance. Thus, a rotor blade 16 according to the present disclosure may define an inboard portion 62, an outboard portion 64, and a bend 66 therebetween. In general, the bend 66 may define and separate the inboard portion 62 and outboard portion 64. Thus, the inboard portion 62 may be that portion of the body 40 extending between the root 32 and the bend 66, and the outboard portion 64 may be that portion of the body 40 extending between the bend 66 and the tip 34. As discussed below, the bend 66 may move the tip 34 away from the tower 12. Further, the bend 66 may be stiffened to reduce or eliminate opening of the bend during deflection of the rotor blade 16, as discussed below. Thus, the bend 66 may advantageously represent the point of closest approach to the tower 12. This may advantageously allow for, for example, the addition of a pressure side or suction side winglet to the rotor blade 16, or may allow for the rotor blade 16 to be designed as smaller and lighter while maintaining the required tower clearance threshold.

The inboard portion 62 and the outboard portion 64 may each be generally linear or, in exemplary embodiments, be generally curved. Curving of a rotor blade 16, such as of the inboard portion 62 and the outboard portion 64, may entail bending the rotor blade 16 in a generally flapwise direction and/or in a generally edgewise direction. The flapwise direction may generally be construed as the direction (or the opposite direction) in which the aerodynamic lift acts on the rotor blade 16. In other words, curving of the inboard portion 62 or the outboard portion 64 in the flapwise direction may generally be construed as curving outwardly away from the tower 12 or inwardly towards the tower 12. If the wind turbine 10 is an upwind turbine, curving outwardly means curving in a direction of the pressure side 42 while curving inwardly means curving in a direction of the suction side 44. If the wind turbine 10 is a downwind turbine, curving outwardly means curving in a direction of the suction side 44 while curving inwardly means curving in a direction of the pressure side 42. The edgewise direction is generally perpendicular to the flapwise direction. In other words, curving of the inboard portion 62 or the outboard portion 64 in the edgewise direction may generally be construed as curving in a direction of the leading edge 46 or in a direction of the trailing edge 48. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may in some embodiments provide some clearance for the rotor blade 16 from the tower 12 and the tower clearance threshold 22 during operation of the wind turbine 10.

Further, the bend 66 defined between the inboard portion 62 and the outboard portion 64 may be defined such that the outboard portion 64 extends outwardly with respect to the inboard portion 62. For example, if the wind turbine 10 is an upwind turbine, the bend 66 may be defined such that the outboard portion 64 extends outwardly in a direction of the pressure side 42 of the blade 16 with respect to the inboard portion 62. If the wind turbine 10 is a downwind turbine, the bend 66 may be defined such that the outboard portion 64 extends outwardly in a direction of the suction side 44 of the blade 16 with respect to the inboard portion 62. Thus, as shown in FIG. 2, which illustrates an upwind turbine, the outboard portion 64 may extend away from the tower 12 from the bend 66 and with respect to the inboard portion 62. It should be understood that the terms "bend" and "bent," as used herein, may include both curved bends (e.g., bends characterized by smooth edges or that offer a smooth transition point), as shown, and angled bends (e.g., bends characterized by edges that meet at a point or that offer a sharp transition point).

Figure 3:
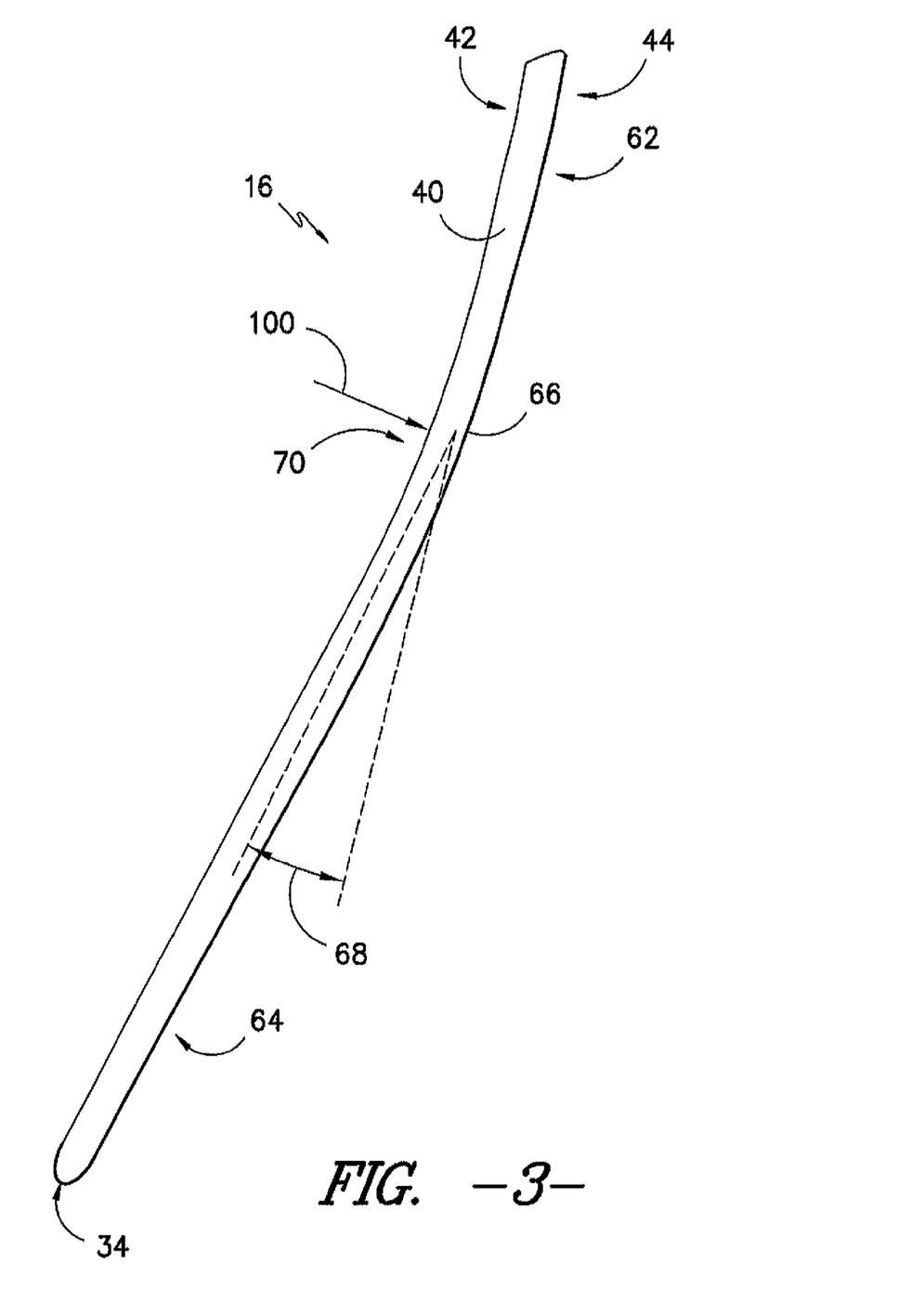
FIG. 3 is an enlarged, partial view of the rotor blade illustrated in FIG. 2 according to one embodiment of the present disclosure.

Referring now to FIG. 3, an enlarged, partial view of the rotor blade 40 depicted in FIG. 2 is illustrated. As shown, the bend 66 may define a bend angle 68. The bend angle 68 may be the angle between the inboard portion 62 adjacent the bend 66 and the outboard portion 64 adjacent the bend 66. Generally, the bend angle 68 may be chosen such that the outboard portion 64 extends sufficiently away from the tower 12. For example, in one embodiment, the bend angle 68 may be less than or equal to approximately 20 degrees, or in the range between approximately 0 degrees and approximately 20 degrees. Alternatively, the bend angle 68 may be less than or equal to approximately 15 degrees, or in the range between approximately 0 degrees and approximately 15 degrees.

Alternatively, the bend angle 68 may be less than or equal to approximately 10 degrees, or in the range between approximately 0 degrees and approximately 10 degrees. It should be understood, however, that the bend 66 is not limited to the above disclosed bend angles 68, and rather that any suitable bend angle 68 is within the scope and spirit of the present disclosure. Further, it should be understood that the bend angle 68 may generally vary for each rotor blade configuration depending on numerous factors including, but not limited to, a span-wise location 70 of the bend 66 along the span 50 at which the bend 66 is defined in the rotor blade 16. For example, as the span-wise location 70 of the bend 66 is moved further towards the tip 34, the bend angle 68 may need to be increased, and vice-versa, as discussed below.

As mentioned above, the bend 66 may have a span-wise location 70 relative to the span 50 of the rotor blade 16. In some embodiments, the bend 66 may have a span-wise location 70 between approximately 50% and approximately 100% of the span 50 of the rotor blade 16. Alternatively, the bend 66 may have a span-wise location 70 between approximately 60% and approximately 100%, or between approximately 60% and approximately 95%, of the span 50 of the rotor blade 16. Alternatively, the bend 66 may have a span-wise location 70 between approximately 66% and approximately 100%, or between approximately 66% and approximately 95%, of the span 50 of the rotor blade 16. However, it should be understood, however, that the bend 66 is not limited to the above disclosed span-wise locations 70, and rather that any suitable span-wise location 70 is within the scope and spirit of the present disclosure. Further, it should be understood that the span-wise location 70 may generally vary for each rotor blade configuration depending on numerous factors including, but not limited to, the bend angle 68. For example, as the bend angle 68 is increased, the span-wise location 70 of the bend 66 may need to be moved further towards the tip 34, and vice versa, as discussed below.

Figure 4:
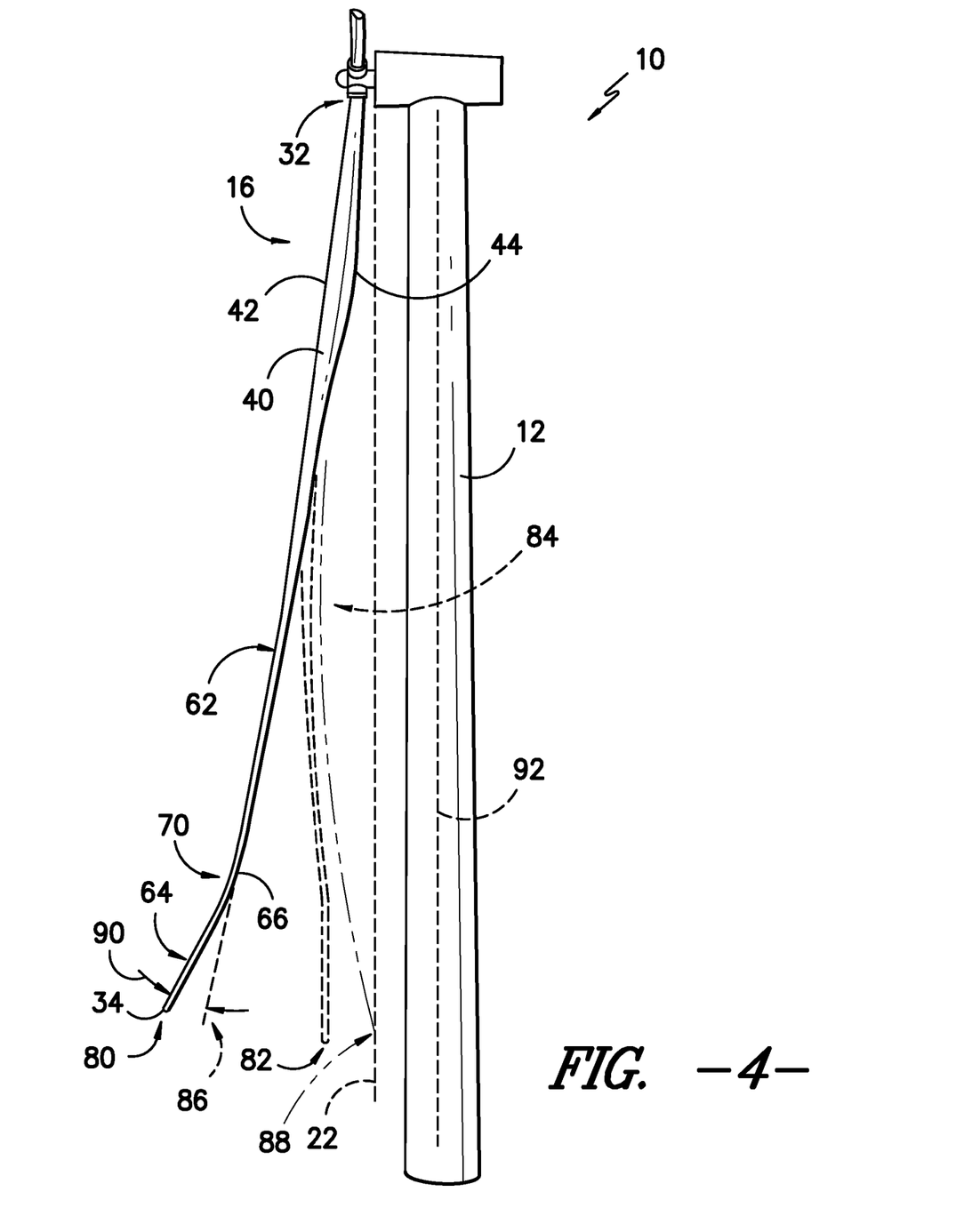
FIG. 4 is a side view of a rotor blade according to one embodiment of the present disclosure, particularly illustrating the rotor blade in a non-deflected/unloaded position and in a deflected/loaded position and comparing such positions to the positions of a conventional rotor blade.

Referring now to FIG. 4, one embodiment of a rotor blade 16 defining a bend 66 as described herein is illustrated in a non-deflected/unloaded position 80 and a deflected/loaded position 82. A conventional rotor blade 84, without a bend 66, is also illustrated in a non-deflected/unloaded position 86 and a deflected/loaded position 88 for purposes of comparison. As shown, during deflection, the point of closest approach of a conventional rotor blade such as rotor blade 84 in a deflected position 88 to the tower clearance threshold 22 may be the tip of that rotor blade. Advantageously, the inclusion of a bend 66 in the rotor blade 16 of the present disclosure may relocate the point of closest approach of the rotor blade 16 to the tower clearance threshold 22. Thus, during deflection, the point of closest approach of the rotor blade 16 in a deflected position 82 to the tower clearance threshold 22 may be the bend 66.

As shown, the rotor blade 16 may define a tip distance 90. The tip distance 90 may be defined by the tip 34 and the inboard portion 62 of the rotor blade 16. For example, the tip distance 90 may be the distance, in the non-deflected position 80 or in the deflected position 82, between the tip 34 and the location of the tip if the bend 66 was absent from the rotor blade 16 and the inboard portion 62 continued to a tip. In other words, the tip distance 90 may be the distance between the tip 34 and the tip of the comparative conventional rotor blade 84 in the non-deflected positions 80, 86 or in the deflected positions 82, 84. The tip distance 90 may represent a desirable additional distance that the tip 34 is spaced from the tower clearance threshold 22.

As discussed above, the bend angle 68 and the span-wise location 70 of the bend 66 may each vary, and may further be interrelated and vary based on each other. In some embodiments, the bend angle 68 and the span-wise location 70, and/or other various factors, may be configured to produce a specified tip distance 90. For example, the bend angle 68 and the span-wise location 70 may each be adjusted to produce a specified tip distance 90. The tip distance 90 may be, for example, in the range between approximately 5 meters and approximately 1 meter, or between approximately 5 meters and approximately 1.5 meters. Alternatively, the tip distance 90 may be in the range between approximately 3 meters and approximately 1 meter, or between approximately 3 meters and approximately 1.5 meters. Alternatively, the tip distance 90 may be in the range between approximately 2.5 meters and approximately 1 meter, or between approximately 2.5 meters and approximately 1.5 meters. The above disclosed ranges for the tip distance 90 may apply in either the non-deflected position 80 or in the deflected position 82. It should be understood, however, that the present disclosure is not limited to the above disclosed tip distances 90, and rather that any suitable tip distance 90 is within the scope and spirit of the present disclosure.

Further, in some exemplary embodiments, the bend 66 may be configured such that the outboard portion 64 is generally parallel to the tower 12, such as to a centerline 92 of the tower 12, during deflection of the blade 16. For example, the bend angle 68, the span-wise location 70 of the bend 66, and/or other various factors may be designed such that the outboard portion 64 becomes generally parallel to the tower during a designed maximum deflection. The designed maximum deflection may be the deflection under a certain maximum load that the rotor blade 16 is designed to withstand. For example, the designed maximum deflection may be represented in FIG. 4 by the deflected position 82 of the rotor blade 16.

As mentioned above, the bend 66 may be stiffened to reduce or eliminate opening of the bend 66 during deflection of the rotor blade 16. "Opening" of the bend 66, as used herein, refers to enlarging of the bend 66 such that the bend angle 68 is reduced. Opening of the bend 66 may be desirably reduced or eliminated such that, during deflection of the rotor blade 16, the bend 66 remains the point of closest approach to the tower clearance threshold 22. (It should be understood that if, during deflection, the outboard portion 64 is generally parallel with the tower 12, then the bend 66 may still be considered as the point of closest approach along with the outboard portion 64.) Further, in exemplary embodiments, the rotor blade 16 and the bend 66 may be configured with regard to opening of the bend 66 such that some portion of the bend 66 is maintained during deflection, and/or such that the outboard portion 64 generally does not cross the tower clearance threshold 22. Notably, if opening of the bend 66 is not reduced or eliminated, the bend angle 68 may be reduced to zero or a negative angle, and the tip 34 may extend past the bend 66 and potentially past the tower clearance threshold 22, increasing the risk of contact with the tower 12 and potentially violating various certification rules. Thus, the bend 66 according to the present disclosure may be stiffened to reduce or prevent opening.

In some embodiments, for example, the bend 66 may have a radius of curvature 100 (see FIGS. 3 and 8) in a certain range that is designed to stiffen the bend 66 and reduce or prevent opening of the bend 66 during deflection of the rotor blade 16. For example, the radius of curvature 100 may be in the range between approximately 1600 millimeters and approximately 3000 millimeters, or between approximately 1600 millimeters and approximately 2500 millimeters. Alternatively, the radius of curvature may be in the range between approximately 1750 millimeters and approximately 3000 millimeters, or between approximately 1750 millimeters and approximately 2500 millimeters. These exemplary ranges have advantageously been shown to stiffen the bend 66 and reduce or prevent opening of the bend 66 during deflection of the rotor blade 16.

Figure 5:
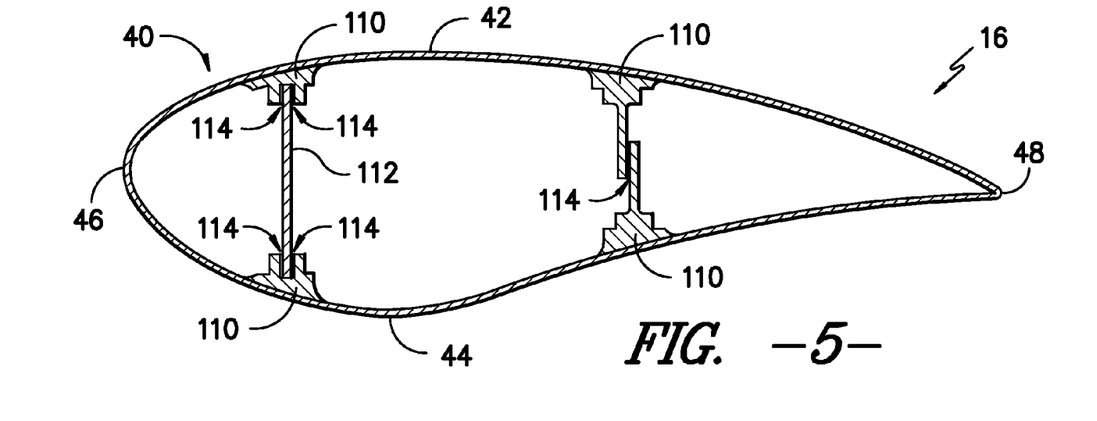
FIG. 5 is a cross-sectional view, along the lines 5-5 of FIG. 2, of a rotor blade including various stiffening features therein according to one embodiment of the present disclosure.
Figure 6:
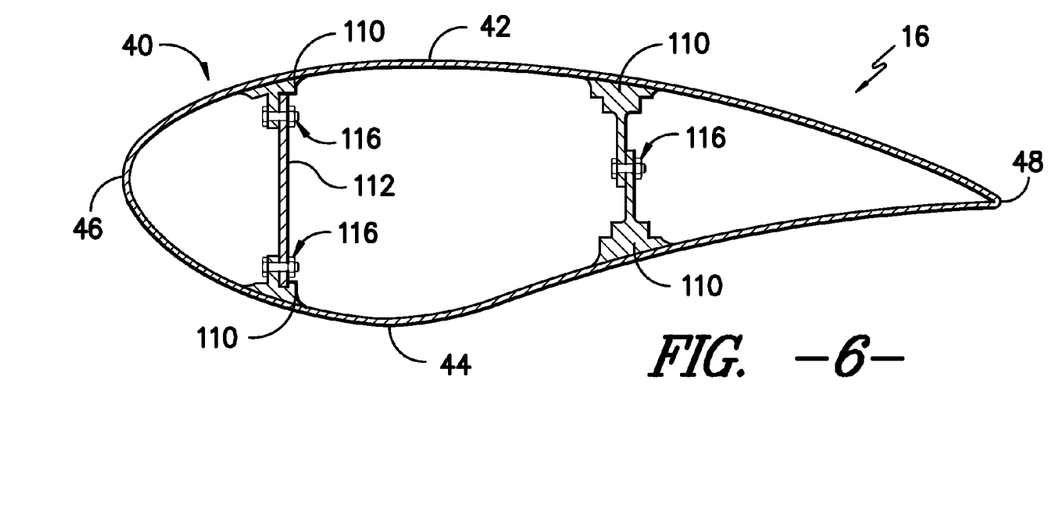
FIG. 6 is a cross-sectional view, along the lines 6-6 of FIG. 2, of a rotor blade including various stiffening features therein according to another embodiment of the present disclosure.

In alternative embodiments, the rotor blade 16 of the present disclosure may include various stiffening features for stiffening the bend 66 and reducing or preventing opening of the bend 66 during deflection of the rotor blade 16. For example, as shown in FIGS. 5 and 6, in some embodiments, the rotor blade 16 may include a plurality of internal stringers 110. Stringers, in general, are internal members that may add stiffness to the rotor blade 16 and/or facilitate the mounting of further internal structures in the rotor blade 16. As shown, the stringers 110 may be arranged inside the body 40 of the rotor blade 16 in pairs, with one stringer 110 configured on the pressure side 42 and the other stringer 110 configured on the suction side 44. Further, one or more pairs of stringers 110 may be arranged inside the rotor blade 16. For example, as shown, one pair of stringers 110 may be disposed proximate the leading edge 46 while another pair of stringers 110 is disposed proximate the trailing edge 46. In exemplary embodiments, the stringers 110 may be configured inside the rotor blade 16 by co-infusing the stringers 110 into the rotor blade 16. It should be understood that the stringers 110 may have any suitable arrangement and/or configuration as required to provide suitable stiffening of the bend 66.

The stringers 110 may extend at least partially through the bend 66. For example, in exemplary embodiments, the stringers 110 may extend through the bend 66 and into the inboard portion 62 and/or the outboard portion 64. The configuration of the stringers 110 in the rotor blade 12 may stiffen the bend 66 and reduce or prevent opening of the bend 66.

In some embodiments, as shown in FIGS. 5 and 6, a rib 112 or a plurality of ribs 112 may be provided between a pair of stringers 110 and mounted to the stringers 110 to stiffen the bend 66. For example, as shown in FIG. 5, a rib 112 may extend between a pair of stringers 110 and be bonded to the stringers 110 utilizing a suitable adhesive 114. The rib 112 may be bonded to the stringer 110 on one or both sides of the rib 112, as desired or required. Additionally or alternatively, as shown in FIG. 6, a rib 112 may extend between a pair of stringers 110 and be fastened to the stringers 110 utilizing a suitable mechanical fastener 116, such as a nut-bolt combination, a rivet, a screw, or a nail.

In other embodiments, cables (not shown) or any other suitable stiffening or reinforcing apparatus may be utilized with the stringers 110 or in place of the stringers 110 to suitably stiffen the bend 66.

In other embodiments, as shown in FIGS. 5 and 6, a pair of stringers 110 may be mounted together to stiffen the bend 66. For example, as shown in FIG. 5, a pair of stringers 110 may be bonded together utilizing a suitable adhesive 114. The stringers 110 may be bonded together on one or both sides, as desired or required. Additionally or alternatively, as shown in FIG. 6, a pair of stringers 110 may be fastened together utilizing a suitable mechanical fastener 116, such as a nut-bolt combination, a rivet, a screw, or a nail.

Thus, as shown in FIGS. 5 and 6, the stringers 110 may be configured to stiffen the bend 66 and reduce or prevent opening of the bend 66 during deflection. Further, advantageously, the stringers 110 and, if desired, the ribs 112 may be bonded and/or fastened such that, when the rotor blade is subjected to various stresses during deflection, the bond or fastening between the stringers 110 or between the stringers 100 and the ribs 112 may be subjected to shearing, rather than tensile forces. By bonding and/or fastening such that the stringers 110 or the stringers 100 and the ribs 112 are subjected to shearing during deflection, a relatively stronger bond or fastening is advantageously created.

Figure 7:
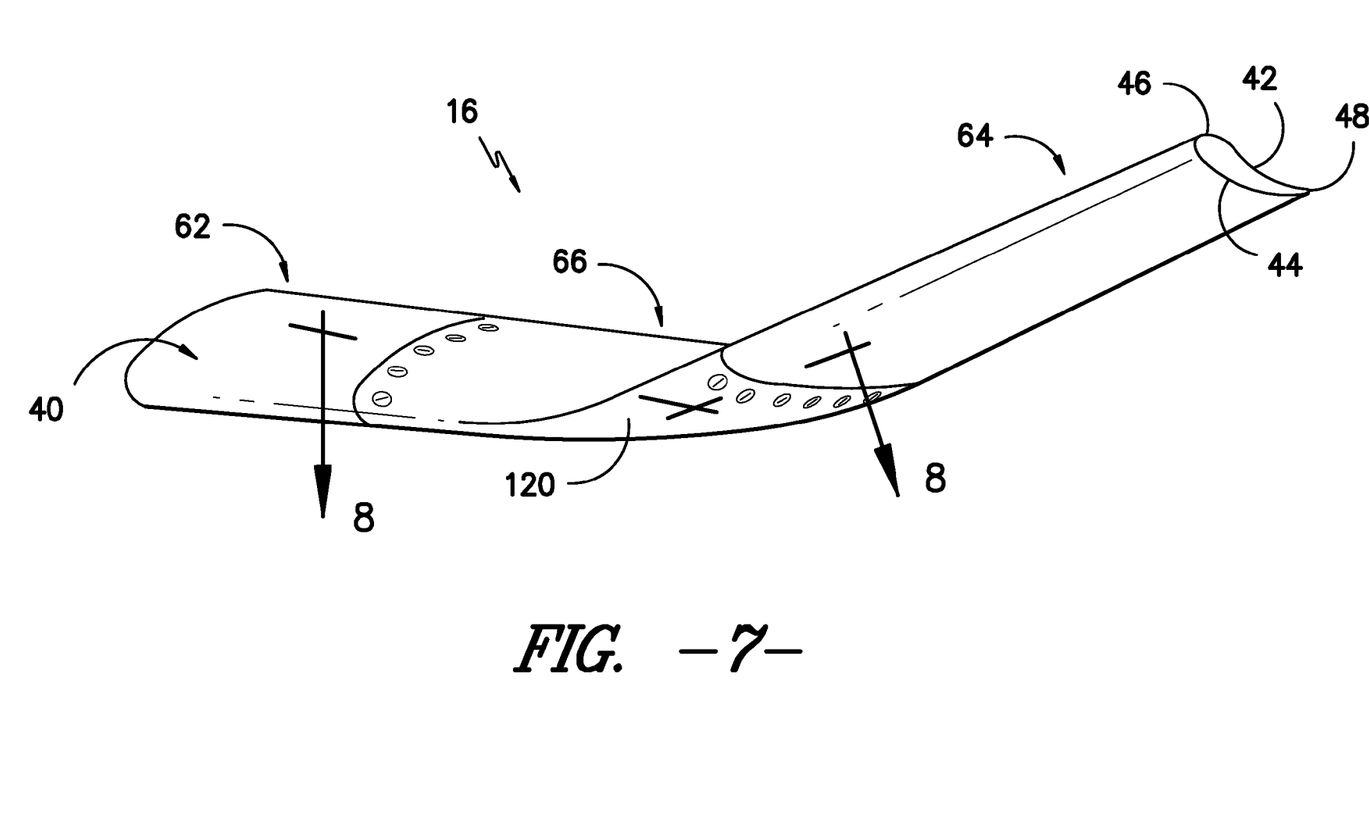
FIG. 7 is a perspective view of a rotor blade including various stiffening features according to yet another embodiment of the present disclosure; and, FIG. 8 is a cross-sectional view, along the lines 8-8 of FIG. 7, of a rotor blade including various stiffening members according to the embodiment as shown in FIG. 7.
Figure 8:
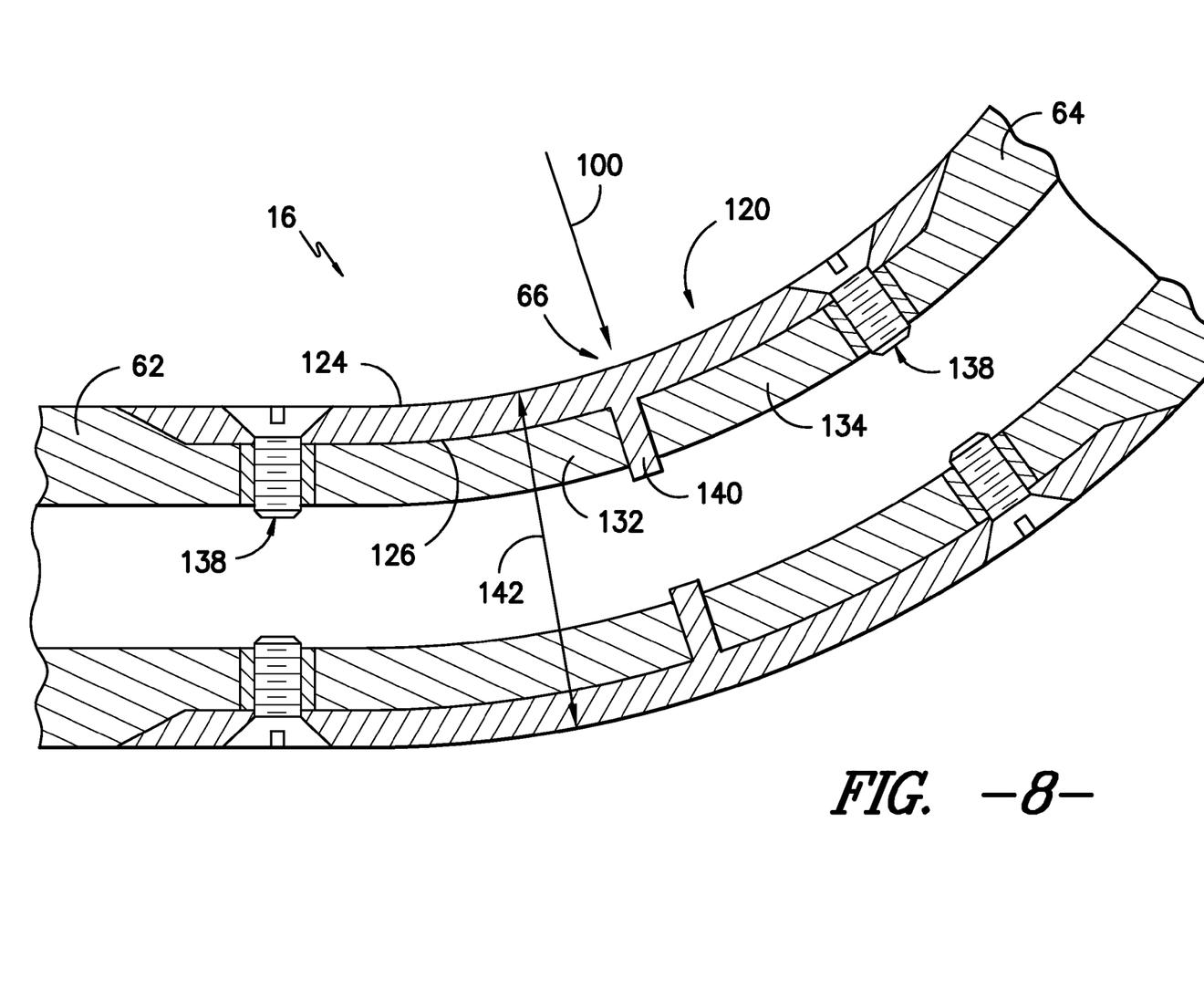

In other embodiments, as shown in FIGS. 7 and 8, the rotor blade 16 may include a joint sleeve 120. The joint sleeve 120 may be disposed between the inboard portion 62 and the outboard portion 64. Further, the joint sleeve 120 may at least partially define the bend 66, and may be configured to stiffen the bend 66.

For example, the joint sleeve 120 may include an inner surface 122 and an outer surface 124. The outer surface 124 may at least partially define the bend, and may further have an aerodynamic profile that corresponds to the aerodynamic profiles of the inboard portion 62 and the outboard portion 64 such that the inboard portion 62, joint sleeve 120, and outboard portion 64 form a continuous aerodynamic surface defining the pressure side 42, suction side 44, leading edge 46, and trailing edge 48.

The joint sleeve 120 may generally be mounted to both the inboard portion 62 and the outboard portion 64. Thus, an end 132 of the inboard portion 62 and an end 134 of the outboard portion 64 may be configured to engage the joint sleeve 120 to mount the joint sleeve 120. In some embodiments, as shown in FIG. 8, the ends 132 and 134 may be configured to engage the inner surface 122 of the joint sleeve 120. The ends 132 and 134 and the joint sleeve 120 may be mounted together through the use of, for example, a suitable adhesive (not shown) or suitable mechanical fastener 138, such as a nut-bolt combination, a rivet, a screw, or a nail.

The joint sleeve 120 may advantageously reinforce the rotor blade 16 at the location of the bend 66. For example, the joint sleeve 120 may be formed from a material that is stronger than the material utilized to form the remainder of the body 40, or may include various divider or stiffener features 140 to separate the inboard portion 62 from the outboard portion 64 and reinforce the rotor blade 16, or may include any other suitable features for reinforcing the rotor blade 16.

In some embodiments, the bend 66 may be defined entirely in the joint sleeve 120. Further, the radius of curvature 100 of the bend 66 in some of these embodiments may be in a certain range that is designed to stiffen the bend 66 and reduce or prevent opening of the bend 66 during deflection of the rotor blade 16. For example, a maximum thickness 142 may be defined for the joint sleeve 120 at the bend 66. The maximum thickness 142 may be measured between the pressure side 42 and the suction side 44 at the thickest chord-wise point of a cross-section of the joint sleeve 120. In some embodiments, the radius of curvature 100 may be greater than or equal to one-half of the maximum thickness 142. This exemplary range has advantageously been shown to stiffen the bend 66 and reduce or prevent opening of the bend 66 during deflection of the rotor blade 16.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, the rotor blade comprising:

a tip;

a root; and, a body extending between the tip and the root and having surfaces defining a pressure side, a suction side, a leading edge, and a trailing edge, the body further defining an inboard portion, an outboard portion, and a bend therebetween, the outboard portion including the tip, the bend defined such that the entire outboard portion extends outwardly with respect to the inboard portion, wherein the bend is stiffened to reduce opening of the bend during deflection of the rotor blade.

2. The rotor blade of claim 1, wherein the bend defines a bend angle of less than or equal to approximately 20 degrees.

3. The rotor blade of claim 1, wherein the bend defines a bend angle of less than or equal to approximately 15 degrees.

4. The rotor blade of claim 1, wherein the bend has a span-wise location between approximately 50% and approximately 100% of a span of the rotor blade.

5. The rotor blade of claim 1, wherein the bend has a span-wise location between approximately 60% and approximately 95% of a span of the rotor blade.

6. The rotor blade of claim 1, wherein the inboard portion of the body is curved generally outwardly.

7. The rotor blade of claim 1, wherein the outboard portion of the body is curved generally outwardly.

8. The rotor blade of claim 1, wherein the bend defines a bend angle and a span-wise location, wherein a tip distance is defined by the tip and the inboard portion, and wherein the bend angle and the span-wise location are configured such that the tip distance is in the range between approximately 5 meters and approximately 1 meter.

9. The rotor blade of claim 1, wherein the bend defines a bend angle and a span-wise location, wherein a tip distance is defined by the tip and the inboard portion, and wherein the bend angle and the span-wise location are configured such that the tip distance is in the range between approximately 3 meters and approximately 1 meter.

10. The rotor blade of claim 1, wherein the bend is configured such that the outboard portion is generally parallel to the tower during a designed maximum deflection of the rotor blade.

11. The rotor blade of claim 1, wherein the bend defines a radius of curvature, and wherein the radius of curvature is in the range between approximately 1600 millimeters and approximately 3000 millimeters.

12. The rotor blade of claim 1, wherein the bend defines a radius of curvature, and wherein the radius of curvature is in the range between approximately 1750 millimeters and approximately 2500 millimeters.

13. The rotor blade of claim 1, wherein the rotor blade further comprises a plurality of internal stringers extending at least partially through the bend and configured to stiffen the bend.

14. The rotor blade of claim 1, wherein the rotor blade further comprises a joint sleeve disposed between the inboard portion and the outboard portion, the joint sleeve at least partially defining the bend and configured to stiffen the bend.

15. A wind turbine, comprising:

a plurality of rotor blades, at least one of the plurality of rotor blades comprising:

a tip;

a root; and, a body extending between the tip and the root and having surfaces defining a pressure side, a suction side, a leading edge, and a trailing edge, the body further defining an inboard portion, an outboard portion, and a bend therebetween, the outboard portion including the tip, the bend defined such that the entire outboard portion extends outwardly with respect to the inboard portion, wherein the bend is stiffened to reduce opening of the bend during deflection of the rotor blade.

16. The wind turbine of claim 15, wherein the bend defines a bend angle of less than or equal to approximately 20 degrees.

17. The wind turbine of claim 15, wherein the bend defines a bend angle and a span-wise location, wherein a tip distance is defined by the tip and the inboard portion, and wherein the bend angle and the span-wise location are configured such that the tip distance is in the range between approximately 5 meters and approximately 1 meter.

18. The wind turbine of claim 15, wherein the bend defines a radius of curvature, and wherein the radius of curvature is in the range between approximately 1600 millimeters and approximately 3000 millimeters.

19. The wind turbine of claim 15, wherein the rotor blade further comprises a plurality of internal stringers extending at least partially through the bend and configured to stiffen the bend.

20. The wind turbine of claim 15, wherein the rotor blade further comprises a joint sleeve disposed between the inboard portion and the outboard portion, the joint sleeve at least partially defining the bend and configured to stiffen the bend.

* * * * *